Patented Mar. 23, 1937

2,074,731

UNITED STATES PATENT OFFICE 2,074,731

BITUMINOUS EMULSION AND METHOD OF PREPARING THE SAME

Claude L. McKesson, San Francisco, Calif., assignor to American Bitumuls Company, San Francisco, Calif., a corporation of Delaware No Drawing. Application February 18, 1936, Serial No. 64,473

21 Claims. (Cl. 134—1)

This invention relates to the manufacture of emulsions and more particularly to the stabilization of bituminous emulsions in order to obtain a product which meets the requirements of practical commercial use.

The term "bituminous emulsions", as here used, embraces emulsions of asphalt, pitch, tar, oil and other similar hydrocarbon products which are normally solid, semi-solid, or highly viscous. Because of the viscous or tacky nature of these materials direct application as binders, impregnants, or superficial coatings, while in a continuous liquid phase is difficult. These difficulties have led to the use of emulsions for such purposes. Water is generally adopted as the vehicle and is the continuous phase of the emulsion which surrounds the individual dispersed particles of the bituminous material. The dispersed bitumen comprises the internal phase of the emulsion.

Bituminous emulsions have commonly been used as binders and saturants for mineral aggregates and fibrous materials. Fibrous materials waterproofed with bituminous emulsions have been used as roofing materials, in the construction of automobiles, as liners for shoes and for many other purposes. When mixed with mineral aggregates bituminous emulsions have found particular utility in the pavement of highways. More recently, the practical utility of particular types of bituminous emulsions for soil stabilization has been demonstrated. The emulsions of the present invention are capable of all of the above applications and are adaptable for use wherever bituminous emulsions have heretofore been utilized. Furthermore, my emulsion has new properties which permit new uses previously thought impractical for bituminous emulsions.

Accordingly, it is the object of my invention to produce a bituminous emulsion which will remain stable, usable and free from objectionable odors during long storage at high temperatures such as are encountered in the summertime. Another object of the invention is to produce a bituminous emulsion which remains stable and free from coagulation or breakdown during repeated cycles of freezing and thawing and which can therefore be satisfactorily stored without protection from freezing in the wintertime in cold regions.

Another object of the invention is to produce an emulsion which upon drying after application as a coating will give a bright, shiny, tacky surface in which the dispersed bituminous particles actually coalesce to form a continuous phase.

The invention has as another purpose, the production of an emulsion which does not result in shrinking or cracking on drying when mixed with cement or other finely divided filler materials and applied as a flooring.

Another and important purpose of the invention is to produce a bituminous emulsion of maximum efficiency for use in the stabilization of soils and other mineral matter, against displacement and/or absorption of water.

Still another purpose is to provide a stabilizing agent for bituminous emulsions which is resistant to deterioration by alkali and which may be added at high mixing temperatures without deleterious effects.

An additional object of the invention is to produce a bituminous emulsion stabilized with defibrinized blood either dried or as received from the slaughter house with fibrin removed.

These and other objects will be apparent from the following description, together with typical examples of my preferred methods of operation.

It is known that certain bituminous materials naturally contain ingredients which react with alkaline materials, such as caustic soda, caustic potash, soda ash, potassium carbonate, sodium metasilicate, and tri-sodium phosphate, to form emulsifying agents. The exact chemical constitution of these ingredients found in certain asphalts, is not known but they are commonly designated, in a generic manner, as asphaltogenic acids. Their reaction products with alkali may be utilized, either alone or in conjunction with other primary emulsifiers, to produce bituminous emulsions.

I prefer to use preformed bituminous emulsions in which the reaction products of alkaline materials with the naturally occurring constituents of the bitumen are the sole primary emulsifying agents. However, it is apparent that the use of suitable auxiliary primary emulsifying agents is within the scope of my invention in its broader aspect. For instance, high molecular weight naphthenic acids may be employed for emulsification in the same manner as the previously mentioned asphaltogenic acids. The alkali salts of such naphthenic acids, formed in situ during emulsification or added separately, may be suitable emulsifying agents. Likewise, high molecular weight acids formed by partial oxidation of petroleum hydrocarbons by methods known in the art, or acids such as those contained in Montan wax, when used as auxiliary primary emulsifiers are regarded as within the broader scope of my invention. The alkali salts of these acids may be formed either separately or in situ during emulsification of the bitumen. I have found, on the other hand, that the presence of fatty acid soaps in the emulsion has an undesirable and deleterious effect on the action of my stabilizing agents, particularly in reducing their storage properties. Preformed emulsion containing fatty acid soaps in small quantities can sometimes be stabilized by my method herein disclosed, but the stabilized emulsion usually has less desirable qualities.

Illustrative methods of preparing bituminous emulsions, suitable for stabilization according to my invention, are disclosed in the patent to Montgomerie, No. 1,643,675 granted September 27, 1927, and in the patent to Braun, No. 1,737,491 granted November 26, 1929. Briefly, the Montgomerie patent discloses emulsification by mixing melted bitumen directly with hot, dilute, alkaline water. Braun forms a bituminous emulsion by adding molten bitumen and alkaline water to a preformed emulsion, often referred to as a "mother liquor", which facilitates emulsification of the bitumen in the added water. Those skilled in the bituminous emulsion art recognize that alkaline water suitable for the above processes may be obtained by the addition of various alkaline materials and it is intended to include such alternative alkali within the scope of my invention and my claims.

My stabilizing agents are particularly efficacious where caustic soda or caustic potash are the alkaline materials used to react with ingredients in the bitumen to produce emulsification.

Bituminous emulsions prepared by such previously known methods are commonly termed "quick-breaking" or "quick-setting" because of their tendency to break down or separate into agglomerated masses when diluted with water, contaminated with electrolytes or foreign matter, or when combined with aggregates or fibrous material or applied to surfaces in the customary methods of handling. Other emulsions partake of quick-breaking characteristics to a greater or less degree depending on the character and quantity of emulsifying agent employed and the method of manufacture. Various expedients have been adopted in an effort to overcome such quick-breaking properties in emulsions of this type to render them stable in the presence of electrolytes and adaptable to use in mixing with other substances.

The addition of quantities of certain stabilizing agents, insufficient in themselves to exert any substantial emulsifying action, but which by some unexplained and unpredictable action effected some stabilization of these emulsions, has been utilized in prior art. Difficulties have been encountered with emulsions so stabilized because of the deleterious effects of even the small quantities of stabilizing agents on the bitumen deposited from the emulsion and because of deterioration of the stabilizing agents after incorporation and their consequent loss of beneficial action.

It has been my experience that the suitability of unproven stabilizing agents for bituminous emulsions is, as a rule, unpredictable and that generalities are inapplicable in these highly empirical developments. As an example, various statements in the literature indicate that proteins as a class may be used as stabilizers for bituminous emulsions and that they may be substituted one for the other as substantial or full equivalents. As a matter of fact, such teachings are erroneous, at least insofar as production of a practical emulsion suitable for commercial purposes is concerned. Glue, for instance, is one of the most commonly mentioned proteins yet so far as I have been able to ascertain will not stabilize bituminous emulsions to produce a commercially satisfactory product. Casein is satisfactory only under certain critical conditions of pH concentration. Dried skimmed milk when used as a stabilizer requires methods of incorporation different from that of casein, a very closely related material, and produces a finished emulsion differing widely in important characteristics from the product disclosed in the present invention. Blood has still different properties as a stabilizing agent and it is the discovery of these properties and the production of a commercially satisfactory emulsion using blood as a stabilizer, which I regard as my invention. Examples of the preferred forms of my invention with a description of the critical factors to be observed, are given in the following paragraphs.

A quick-breaking emulsion of bitumen dispersed in water is prepared according to the methods in either the Braun or Montgomerie patents. This emulsion when completed should for my purposes generally have an alkalinity expressed by a pH value greater than 11.5 and usually less than 13.5. The preformed emulsion, so obtained, is then stabilized with blood.

Either blood in its natural condition, except that it is preferably first defibrinized, or blood powder which has been dried without subjecting to temperatures high enough to render the dried blood water insoluble, is suitable. If blood powder is used it may be added directly in a dry state or by first dispersing in water to give, for example, a 20%–25% solution before addition to the emulsion. Sufficient blood should be incorporated to give at least 0.1% by weight of solids based on the weight of the completed emulsion. The most effective range seems to be from 0.3% to 1.0% by weight based on the completed emulsion. The blood may be added while the emulsion is still hot from the manufacturing operation. So far as can be ascertained, high temperatures of the emulsion at the time of stabilization have no substantial adverse effect on the stabilizing action of blood. Such a phenomenon is surprising in view of the fact that heating the blood to high temperatures prior to addition to the emulsion is destructive to its efficiency as a stabilizer.

Obviously, I am not to be precluded from adding the stabilizer to an emulsion which may have cooled to atmospheric temperatures, particularly where it is found inconvenient to handle a hot emulsion during incorporation of the blood therein, or at any temperature between atmospheric and manufacturing temperatures. However, I prefer to add the stabilizer to the emulsion while at a temperature of approximately 165° F. to 185° F., which is the temperature commonly resulting from the manufacturing operation. By so doing I avoid the delay incident to cooling before adding the stabilizer.

The degree of alkalinity of the stabilized emulsion is of critical importance. Adequate alkalinity is absolutely necessary in order to obtain a product having satisfactory storage and mixing properties. Ordinarily in making emulsions stabilized with blood by my methods, the finished product shows a pH of 11.5 (plus), as has been previously pointed out. After long time storage chemical reactions evidently occur and the pH ultimately drops as low as 9.0, or even slightly lower, yet the emulsion is still usable. Emulsions reaching a pH of less than 9.0 usually show appreciable deterioration, and a pH of 9.0 is regarded as the lowest safe limit of alkalinity. Alkali may be added to maintain the pH above this point, when necessary. The upper limit of the pH concentration is for my purposes not critical within the range wherein the preformed emulsion itself is satisfactory, that is, stable against coalescence of the dispersed phase under storage conditions at atmospheric temperatures above 32° F.

In some instances and for some purposes, a blood stabilized emulsion having a pH of 11.5 (plus) is preferably neutralized to a point between pH 10 and pH 11. A suitable neutralizing agent is phosphoric acid ($H_3PO_4$), although other weakly acid solutions may be used. This partially neutralized, though still very alkaline emulsion, has decidedly different physical characteristics from the unneutralized product. For example, it has a more rapid rate of drying. However, when used in Portland cement mixtures the composition shows appreciable shrinkage. The unneutralized emulsion, on the contrary, may be mixed readily in Portland cement without any evidence of shrinkage upon drying and setting. The partially neutralized emulsion has greater resistance to heat deterioration while the unneutralized emulsion is more resistant to freezing.

The unneutralized emulsion has the unexpected and very valuable property of being highly resistant to damage by freezing and subsequent thawing even when repeated in cycles over a long period and under temperatures as low as −20° F. An emulsion containing as little as 0.6 per cent, dry weight, of blood, has been stored in the open without protection from freezing through a severely cold winter, and has been found to be usable and in perfect condition the following summer. Other proteins such as glue, casein, milk do not give this valuable winter storage property to an emulsion.

Thus I have found that the partially neutralized emulsion has particular utility where the increased drying rate is of preeminent importance. The unneutralized emulsion is preferred where a Portland cement or similar composition is to be made and where shrinkage is undesirable. To convert a normally quick-breaking emulsion to a mixing emulsion of general utility which will be stable against breakdown from addition of electrolytes or long storage, all blood stabilized bituminous emulsions must have a pH above approximately 9.0 as has been previously indicated.

It is also essential that the blood used as a stabilizer be pretreated in a proper manner. If liquid blood is used, it is preferable that it first be defibrinized by processes well known in the art. If blood in a dry state is to be used it is desirable that, in addition to the above defibrinizing treatment, the drying operation be carried out at temperatures low enough to prevent rendering the dried blood water insoluble. If high temperatures are used for drying, decomposition processes occur (probably a coagulation of albumen contained in the blood) which render the product difficultly soluble in water and unsuitable for my purposes. Methods of drying, as for instance drying at atmospheric temperatures and/or under vacuum, to prevent decomposition or coagulation of proteins in the blood, are known to the manufacturers of dried blood.

Throughout the claims I intend to designate by the term "water miscible blood", either a dried or liquid product which will readily disperse in water, and by "defibrinized blood" a product from which fibrin has been removed by any suitable method. By the term "water soluble or water miscible dried blood" I intend to define a product which has been dried under conditions to prevent substantial decomposition of the proteins and which as a result is easily dispersible in water without the aid of alkali.

In addition to the stabilizer, I usually find it desirable to incorporate a preservative in my emulsion to prevent deterioration by mold or bacterial action. Sodium arsenite or formaldehyde are examples of suitable preservatives. Other suitable materials known to be preservatives for blood and similar proteins obviously are within the scope of my invention.

Formaldehyde is preferred as a preservative for blood stabilized emulsions which are to be used for soil stabilization and for other uses where the emulsion is not to be subjected to freezing before use. Sodium arsenite is preferred as a preservative for emulsions which may be subjected to freezing before use. Formaldehyde reduces the immunity to damage from freezing while sodium arsenite does not similarly effect this valuable winter storage property found in the unneutralized blood stabilized emulsion. The use of any preservative in emulsions for winter use is unnecessary unless it is expected that the emulsion will also be subjected to heat or to hot weather prior to use.

To exemplify my invention in further detail the preparation, proportions and storage properties of several blood stabilized emulsions containing such preservatives will now be described.

A quick-breaking bituminous emulsion containing 58% of bitumen dispersed in water rendered alkaline with caustic alkali, was prepared at a temperature of 176° F. according to the method described in the Braun patent. Water-soluble defibrinized dried blood was dispersed in water to give a 20% solution. This solution was added to the emulsion while at substantially the manufacturing temperature, in quantity to give 1% by weight of blood solids based on the complete emulsion. A 20% solution of sodium arsenite was also added in sufficient quantity to give 0.2% by weight of the arsenite in the completed emulsion.

The emulsion prepared as above showed no signs of substantial deterioration after storage for 100 days at 105° F. After this test it still mixed perfectly with Portland cement, thereby demonstrating stability against the action of electrolytes, even after heat treatment which would have destroyed the Portland cement mixing property of a casein stabilized emulsion having a similar pH value.

A stabilized emulsion was prepared as above described. Formaldehyde was substituted for sodium arsenite as a preservative, and was added to the emulsion after cooling. Three batches were prepared using respectively 0.1, 0.3, and 0.5% of formaldehyde and found to be in a satisfactory condition after 120 days storage at 105° F. Other samples of emulsions stabilized and preserved as above have been stored without protection from solar heat or winter cold under temperatures from about 20° F. to over 120° F. for more than a year without the loss of any of their valuable properties.

An emulsion containing 58% petroleum asphalt was prepared according to the method of Braun and cooled to 90° F. Water-soluble dried blood was added in the amount of 0.6% by weight and mixed in the preformed emulsion which was then neutralized to a pH of 9.7, by addition of dilute phosphoric acid ($H_3PO_4$). This stabilized and partially neutralized emulsion was preserved with 0.2% formalin. It was found to be in good condition after 415 days at atmospheric temperatures followed by 210 days storage at 105° F.

The same test was made on an identical emulsion except that the blood was added to the emulsion while the emulsion was at a temperature of about 165° F. and its condition was perfect after the same exposure for the same period and under the same temperatures. Two other portions of a like emulsion were preserved with respectively 0.1% and 0.3% of sodium arsenite. The batch containing 0.1% sodium arsenite developed an odor during the first 27 days which subsequently decreased and after 120 days storage at 105° F. the emulsion was found to be satisfactory. The second batch was found to be satisfactory after 120 days of similar hot storage.

A bituminous emulsion stabilized according to my invention, has many uses and advantages which are apparent from its description. The critical conditions of pH concentration in conjunction with my particular stabilizers give unexpected and highly desirable properties. To emphasize the utility of my discovery and the empirical nature of the development of stabilizers, the following additional distinctions and advantages are pointed out.

A quick-breaking bituminous emulsion of pH 11.5 (plus) stabilized with 1% glue, breaks on addition of 59.9 grams of cement to 100 grams of emulsion, and shows signs of partial breaking on addition of 50 grams of the cement. The same quick-breaking emulsion stabilized with 1% defibrinized blood, mixes perfectly with cement in the above and even greater proportions.

As compared with casein stabilized emulsions, blood gives surprising improvements in the following respects: casein stabilized emulsions must be partially neutralized to give suitable storage properties. In such emulsions, casein, even in very small amounts, prevents coalescence of the dispersed bitumen particles when deposited from the emulsion. A dead unattractive film results which is in reality a mass of discrete bitumen particles coated and bonded together with casein. A blood stabilizer has no such action and permits actual coalescence of the dispersed bitumen particles as they are deposited from the emulsion. A bright, shiny, tacky film results, which is regarded in the trade as highly desirable. In addition, the blood stabilizer is more resistant to deterioration by strong alkali than is casein and requires less neutralization of the completed emulsion with the consequent saving in acid.

The unneutralized emulsion stabilized with blood offers an important and unexpected improvement when mixed with Portland cement. As has been previously indicated, such a composition dries and sets without shrinkage or cracking. This result is unpredictable and was not obtainable with casein emulsions having satisfactory storage properties. My non-shrinking asphaltic concrete composition enables construction of floors and other building structures, previously thought impractical because of the difficulties produced by cracking.

Many variations in composition and uses are believed to be within the scope of my invention in its generic aspect. For instance, the bituminous material dispersed may be of either high or low melting point, solid, semi-solid or semi-liquid, depending upon the properties desired of the deposited material. Hardness, ductility and fusibility of the bitumen may be altered and controlled by the use of blending agents.

Fibrous fillers, such as asbestos, or organic fibers such as cotton, and mineral pigment fillers such as ground petroleum coke, iron oxide, chromium oxide, or limestone dust, may be added singly or in combination to the completed emulsion when desired. Such fillers and pigments may be mixed with the blood stabilizer prior to incorporation in the emulsion, but are preferably incorporated separately from the blood and after it has been added to stabilize the emulsion.

By the term "filler" recited in the claims I intend to include added powdered or fibrous materials of any of the types above described.

A typical example of the proportions in which these materials may be satisfactorily mixed is as follows:

| | Percent |
|---|---|
| Emulsion containing 55–60% asphalt | 46 |
| Pigment filler | 18 |
| Fibrous filler | 12 |
| Water in addition to that naturally present in the emulsion | 24 |

Inorganic cementitious materials other than Portland cement may also be mixed with my stabilized emulsion. Hydrated lime and gypsum comprise two common cement materials analogous to Portland cement.

My emulsion is adapted for use as a coating or waterproofing composition for metal, wood, or concrete structures; for impregnation of woven fabrics, felted fabrics and paper; for pipe sealing compounds; for electrical insulation compounds; for mixing with mineral aggregates in paving and other similar operations; and for soil stabilization processes.

Although I have described preferred embodiments of my invention, in great detail, I desire it to be understood that the invention is not limited thereto but comprehends all of the variations and modifications within the scope of the appended claims.

I claim:

1. A bituminous emulsion of the oil-in-water type comprising a preformed quick-breaking emulsion stabilized with water miscible blood, the pH of said emulsion being greater than approximately 9.0 and less than that at which the preformed emulsion is rendered unsatisfactory by high alkalinity.

2. A bituminous emulsion of the oil-in-water type comprising a preformed emulsion containing water soluble soaps and stabilized with water miscible blood, the pH of said emulsion being greater than approximately 9.0 and less than that at which the preformed emulsion is rendered unsatisfactory by high alkalinity.

3. A bituminous emulsion of the oil-in-water type comprising a preformed quick-breaking emulsion stabilized with water miscible defibrinized blood, the pH of said emulsion being greater than approximately 9.0 and less than that at which the preformed emulsion is rendered unsatisfactory by high alkalinity.

4. A bituminous emulsion of the oil-in-water type comprising a preformed quick-breaking emulsion of bitumen held in dispersion in water by an emulsifying agent free from fatty acid soaps, and a stabilizer for said preformed emulsion comprising water-miscible defibrinized blood, the pH of the stabilized emulsion being greater than approximately 9.0 and less than that at which the preformed emulsion is rendered unsatisfactory by high alkalinity.

5. A bituminous emulsion of the oil-in-water type comprising a preformed quick-breaking emulsion of bitumen held in dispersion in water by an emulsifying agent consisting only of the reaction products of naturally occurring asphaltogenic acids and an alkali, and a stabilizer for said preformed emulsion consisting of water-miscible defibrinized blood, the pH of the stabilized emulsion being greater than approximately 9.0 and less than that at which the preformed emulsion is rendered unsatisfactory by high alkalinity.

6. A bituminous emulsion of the oil-in-water type comprising a preformed quick-breaking emulsion stabilized with water miscible blood, the alkalinity of said emulsion being adjusted to a pH of from 10 to 11.

7. A bituminous emulsion of the oil-in-water type comprising a preformed quick-breaking emulsion stabilized with water miscible blood, the pH of said emulsion being greater than approximately 11.5 and less than that at which the preformed emulsion is rendered unsatisfactory by high alkalinity.

8. A bituminous emulsion of the oil-in-water type comprising a preformed quick-breaking emulsion of bitumen held in dispersion in water by an emulsifying agent free from fatty acid soaps, and a stabilizer for said preformed emulsion comprising water miscible defibrinized blood, the alkalinity of the stabilized emulsion being adjusted to a pH of from 10 to 11.

9. A bituminous emulsion of the oil-in-water type comprising a preformed quick-breaking emulsion of bitumen held in dispersion in water by an emulsifying agent free from fatty acid soaps, and a stabilizer for said preformed emulsion comprising water miscible defibrinized blood, the pH of the stabilized emulsion being greater than approximately 11.5 and less than that at which the preformed emulsion is rendered unsatisfactory by high alkalinity.

10. A bituminous emulsion of the oil-in-water type comprising a preformed quick-breaking emulsion of bitumen held in dispersion in water by an emulsifying agent consisting only of the reaction products of naturally occurring asphaltogenic acids and an alkali, and a stabilizer for said preformed emulsion consisting of water miscible defibrinized blood, the alkalinity of the stabilized emulsion being adjusted to a pH of from 10 to 11.

11. A bituminous emulsion of the oil-in-water type comprising a preformed quick-breaking emulsion of bitumen held in dispersion in water by an emulsifying agent consisting only of the reaction products of naturally occurring asphaltogenic acids and an alkali, and a stabilizer for said preformed emulsion consisting of water miscible defibrinized blood, the pH of the stabilized emulsion being greater than approximately 11.5 and less than that at which the preformed emulsion is rendered unsatisfactory by high alkalinity.

12. A bituminous emulsion of the oil-in-water type comprising a preformed quick-breaking emulsion, a stabilizer comprising water miscible blood, and a preservative, the pH of said emulsion being greater than approximately 9.0 and less than that at which the preformed emulsion is rendered unsatisfactory by high alkalinity.

13. A bituminous emulsion of the oil-in-water type comprising a preformed quick-breaking emulsion of bitumen held in dispersion in water by an emulsifying agent free from fatty acid soaps, a stabilizer for said preformed emulsion comprising water miscible defibrinized blood, a preservative for said stabilizer comprising an alkali metal arsenate, the pH of the stabilized emulsion being greater than approximately 9.0 and less than that at which the preformed emulsion is rendered unsatisfactory by high alkalinity.

14. A bituminous emulsion of the oil-in-water type comprising a preformed quick-breaking emulsion of bitumen held in dispersion in water by an emulsifying agent consisting only of the reaction products of naturally occurring asphaltogenic acids and an alkali, a stabilizer for said preformed emulsion consisting of water miscible defibrinized blood, and a preservative for said blood comprising formaldehyde, the pH of the stabilized emulsion being adjusted to a pH of from approximately 10 to 11.

15. A bituminous emulsion of the oil-in-water type comprising a preformed quick-breaking emulsion stabilized with a water-soluble dried blood, the pH of said emulsion being greater than approximately 9.0 and less than that at which the preformed emulsion is rendered unsatisfactory by high alkalinity.

16. A bituminous emulsion of the oil-in-water type comprising a preformed quick-breaking emulsion of bitumen held in dispersion in water by an emulsifying agent free from fatty acid soaps, and a stabilizer for said preformed emulsion comprising a water-soluble defibrinized dried blood, the pH of the stabilized emulsion being greater than approximately 9.0 and less than that at which the preformed emulsion is rendered unsatisfactory by high alkalinity.

17. A bituminous emulsion of the oil-in-water type comprising a preformed quick-breaking emulsion of bitumen held in dispersion in water by an emulsifying agent consisting only of the reaction products of naturally occurring asphaltogenic acids and an alkali, and a stabilizer for said preformed emulsion consisting of water-soluble defibrinized dried blood, the pH of the stabilized emulsion being greater than approximately 9.0 and less than that at which the preformed emulsion is rendered unsatisfactory by high alkalinity.

18. The method of preparing a mixing emulsion which comprises, forming a quick-breaking emulsion by dispersing hot molten bituminous materials in water and converting said quick-breaking emulsion to a mixing emulsion by adding water miscible blood while said emulsion is hot from the dispersing operation.

19. The method of preparing a mixing emulsion which comprises, forming a quick-breaking emulsion by dispersing hot molten bituminous materials in water sufficiently alkaline to produce an emulsion having a pH greater than 11.5 and less than that at which the preformed emulsion is rendered unsatisfactory by high alkalinity and converting said quick-breaking emulsion to a mixing emulsion by adding water miscible blood while said emulsion is hot from the dispersing operation.

20. In a method of stabilizing quick-breaking bituminous emulsions which comprises dispersing the bituminous materials in alkaline water without the aid of added emulsifying agents, the steps of adding water miscible blood to the preformed emulsion and adjusting the alkalinity of the stabilized emulsion to a pH of from 10 to 11.

21. In a method of stabilizing quick-breaking emulsions which comprises, dispersing bituminous materials in alkaline water without the aid of added emulsifying agents, the steps of adding water miscible blood to the preformed emulsion and maintaining the alkalinity above a pH of approximately 9.0.

CLAUDE L. McKESSON.